US009167460B2

(12) United States Patent
Bernard et al.

(10) Patent No.: US 9,167,460 B2
(45) Date of Patent: Oct. 20, 2015

(54) DETECTION OF CABLE NETWORK INTERFERENCE ON WIRELESS NETWORK

(71) Applicant: Rogers Communications Inc., Toronto (CA)

(72) Inventors: Jean-Yves Bernard, Montreal (CA); George Maynard Hart, Milton (CA); Edward A. O'Leary, Ajax (CA)

(73) Assignee: ROGERS COMMUNICATIONS INC., Toronto, Ontario (CA)

( * ) Notice: Subject to any disclaimer, the term of this patent is extended or adjusted under 35 U.S.C. 154(b) by 175 days.

(21) Appl. No.: 13/930,237

(22) Filed: Jun. 28, 2013

(65) Prior Publication Data

US 2015/0003226 A1    Jan. 1, 2015

(51) Int. Cl.
*H04W 24/08*    (2009.01)

(52) U.S. Cl.
CPC ..................................... *H04W 24/08* (2013.01)

(58) Field of Classification Search
CPC ... H04W 24/08; H04W 84/12; H04W 84/045; H04W 1/0003; H04W 1/0009; H04W 72/0453; H04W 72/04; H04W 72/0406; H04W 72/082; H04W 24/02
USPC .................. 370/210, 328, 329, 252, 230, 336
See application file for complete search history.

(56) References Cited

U.S. PATENT DOCUMENTS

| 8,229,363 | B1 | 7/2012 | Sahin et al. |
| 2003/0040277 | A1* | 2/2003 | Deats .............................. 455/63 |
| 2010/0246483 | A1* | 9/2010 | Erceg et al. ................... 370/328 |
| 2012/0155307 | A1 | 6/2012 | Turk et al. |
| 2013/0003674 | A1 | 1/2013 | Lin et al. |
| 2013/0028201 | A1 | 1/2013 | Koo et al. |
| 2013/0029704 | A1 | 1/2013 | Koo et al. |

OTHER PUBLICATIONS

Denisowski, et al., "Recognizing and Resolving LTE/CATV Interference Issues", Retrieved Mar. 28, 2013.
Denisowski, et al.,"Recognizing and Resolving LTE/CATV Interference Issues", White Paper, Retrieved Mar. 28, 2013.

* cited by examiner

*Primary Examiner* — Jamal Javaid
(74) *Attorney, Agent, or Firm* — Rowand LLP

(57) ABSTRACT

Described are methods and devices for detecting cable network interference on a wireless network. In one aspect, disclosed is a method, performed by a processor of a cable interference detection device, of detecting interference in a wireless network caused by a cable network. The method includes: obtaining a signal signature of a wireless signal received at a receiver of a mobile communication device, the signal signature being a fast fourier transform representation of the wireless signal; and determining that the wireless signal represents interference caused by the cable network by comparing the signal signature to a cable network signal signature.

16 Claims, 6 Drawing Sheets

DETECTION OF CABLE NETWORK INTERFERENCE ON WIRELESS NETWORK

TECHNICAL FIELD

The present disclosure relates to wireless networks and, more particularly, to methods and systems for detecting interference on a wireless network device which is caused by a cable network.

BACKGROUND

Wireless networks sometimes suffer from interference caused by wired networks (such as cable networks) having network components situated in the vicinity of the wireless networks and, more particularly, in the vicinity of wireless network devices.

In order to attempt to remove such sources of interference, a mobile network operator (MNO) operating the wireless network must first detect the existence of such interference. In practice, the MNO first determines that its downlink or uplink radio channels are suffering from signal degradation and then sends technicians into the field to locate the source of the problem. Thus, identification and localization of such interference signals typically requires a skilled technician who goes into the field with test equipment that may be used to analyze wireless signals in the vicinity of the test equipment. Such equipment may output a radiation emission leak level, which indicates the strength of an interference signal received at the test equipment.

The source of the interference may then be located by physically moving the test equipment or an antenna connected to the test equipment and reviewing the effect of the movement on the radiation emission leak level indicated by the test equipment. If the radiation emission leak level increases, then the operator may conclude that the equipment or antenna is nearer the source of the interference than it was previously. If it decreases, then the operator may conclude that the equipment is further from the source of the interference than it was previously.

If the MNO determines that the source of the interference appears to be caused by a cable network, it may notify the cable network operator who may then send a repair person to correct any cable network problem found to exist.

Thus, the current techniques that are used to identify and correct such interference issues are very resource intensive. Using current techniques, it sometimes takes weeks or even months before an interference source is identified and corrected.

BRIEF DESCRIPTION OF THE DRAWINGS

Reference will now be made, by way of example, to the accompanying drawings which show example embodiments of the present application and in which.

Like reference numerals are used in the drawings to denote like elements and components.

DETAILED DESCRIPTION OF EXAMPLE EMBODIMENTS

In one aspect, disclosed is a method, performed by a processor of a cable interference detection device, of detecting interference in a wireless network caused by a cable network. The method includes: obtaining a signal signature of a wireless signal received at a receiver of a mobile communication device, the signal signature being a fast fourier transform representation of the wireless signal; and determining that the wireless signal represents interference caused by the cable network by comparing the signal signature to a cable network signal signature.

In another aspect, a cable interference detection device is described. The cable interference detection device includes a communication subsystem for obtaining a signal signature of a wireless signal received at a receiver of a mobile communication device. The signal signature is a fast fourier transform representation of the wireless signal. The cable interference detection device further includes a memory for storing a cable network signal signature and a processor coupled with the communication subsystem and the memory. The processor is configured to determine that the wireless signal represents interference caused by the cable network by comparing the signal signature obtained at the communication subsystem with the cable network signal signature.

In yet another aspect, a mobile communication device is described. The mobile communication device includes a receiver for receiving a wireless signal. The receiver is associated with a fast fourier transform block which performs a fast fourier transform on a received wireless signal to obtain a signal signature. The mobile communication device further includes a transmitter for communicating with a wireless network and a processor coupled with the receiver and the transmitter. The processor is configured to: determine that the wireless signal is an interference signal; and send information to a system connected to the wireless network in response to determining that the wireless signal is an interference signal.

Other example embodiments of the present disclosure will be apparent to those of ordinary skill in the art from a review of the following detailed description in conjunction with the drawings.

Example Operating Environment

Figure 1:
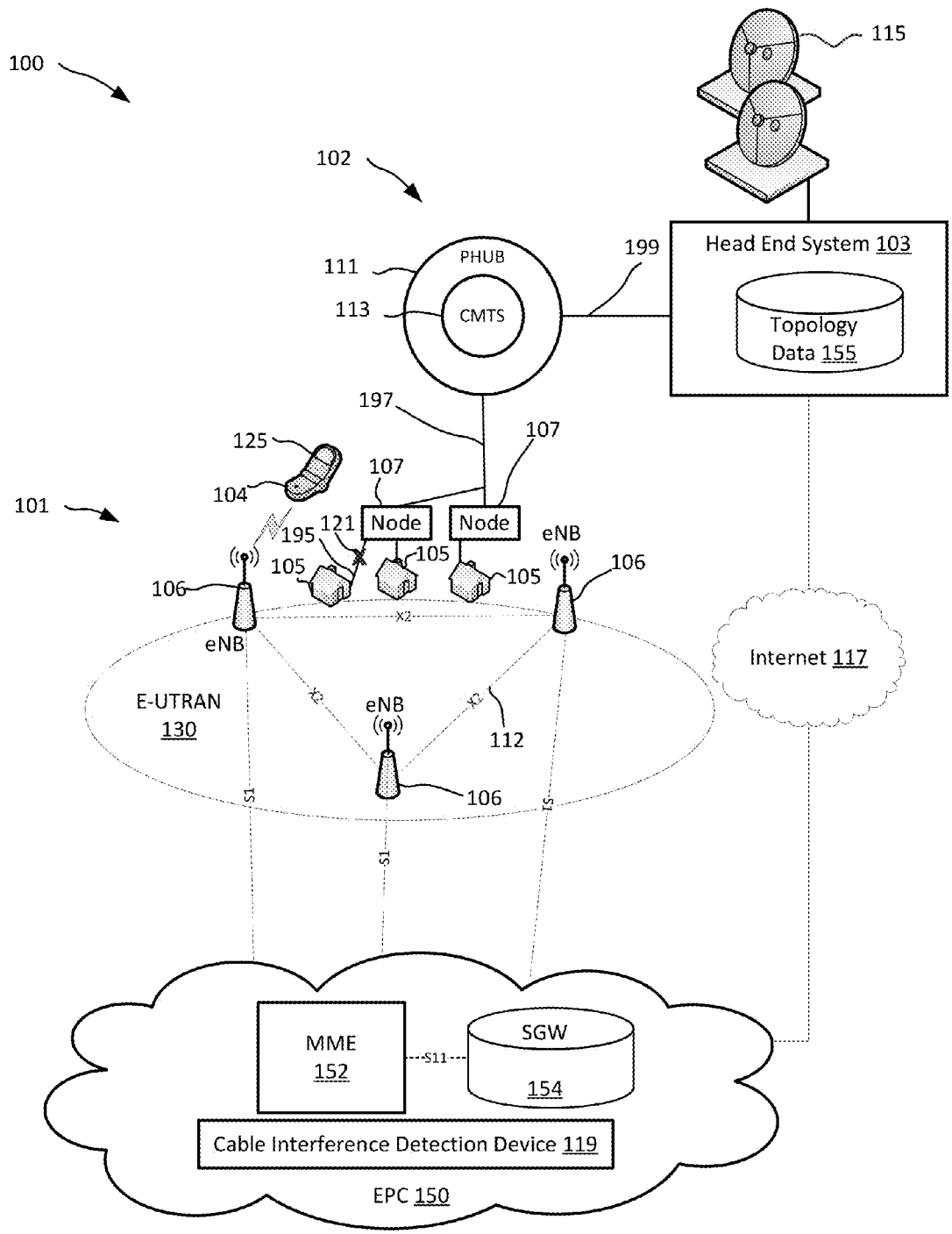
FIG. 1 is a block diagram of an example operating environment which includes a wired network and a wireless network in accordance with example embodiments of the present disclosure.

FIG. 1 is a block diagram of an example operating environment 100 which includes a wireless network 101 and a wired network 102 having components situated in the vicinity of the wireless network 101. That is, the wired network 102 has at least some infrastructure elements situated in a coverage area of the wireless network 101.

Example Wireless Network

The wireless network 101 may be a subscriber network which is configured to provide services such as, for example, subscription-based services or other wireless services to a plurality of mobile communication devices 104. For example, the wireless network 101 may provide voice communication services to mobile communication devices 104 operating within a coverage area provided by the wireless network 101. That is, the wireless network 101 may allow the mobile communication device 104 to engage in voice-based communications, such as telephone calls, with other devices such as other smartphones, mobile phone, or landline-based telephones.

In at least some embodiments, the wireless network 101 may provide data communication services to the mobile communication devices 104. For example, the wireless network 101 may allow mobile communication devices 104 to send to and/or receive data from other devices or systems such as other mobile communication devices 104 or servers. For example, the wireless network 101 may, in at least some embodiments, provide access to one or more public or private networks such as, for example, the Internet.

The mobile communication devices 104 that operate within the wireless network 101 may take any one of a number of different forms. By way of example, the mobile communication devices 104 may include smartphones, tablets, modems, computing devices, or mobile communication devices 104 of another type.

The example wireless network is a network that is configured to operate according to a 3rd Generation Partnership Project (3GPP) standard. 3GPP is a wireless industry standards organization that develops and maintains wireless network access technologies. In the example shown, the wireless network 101 is an LTE network (which may also be referred to as a 3G LTE wireless network 101). LTE is a standard for wireless communication of high-speed data to mobile communication devices 104. Accordingly, the example wireless network 101 is an orthogonal frequency division multiplexing (OFDM) based wireless network 101. It will be appreciated, however, that the wireless network 101 may take other forms in other embodiments. That is, the methods and devices for identifying an interference source described herein may be applied to networks which operate differently than the present LTE standard. The methods and devices may also be used with evolutions and variations of such standards including, for example, LTE Advanced.

The wireless network 101 may be allocated and operate over a defined set of frequencies. Typically, a wireless spectrum is divided up into discrete sets of bands and a specific wireless network 101 may only be permitted to operate using a specific band or set of bands. These bands may be called LTE bands. That is, the wireless network 101 may utilize band specifications that are a part of the LTE standard. If another communication technology is utilized, then the bands may have different names. For example, if LTE Advanced is used, then the bands may be referred to as LTE-Advanced bands.

In at least some embodiments, the wireless network may be configured to utilize a relatively low frequency LTE band. For example, in at least some embodiments, a 700 MHz LTE band may be used.

The wireless network may, in at least some embodiments, utilize a digital dividend band. A digital dividend refers to the spectrum that is released in the process of transitioning to digital television technology. Digital dividend bands tend to be relatively low frequency bands. In some jurisdictions, the 700 MHz band is an example of a digital dividend band. However, the spectrum available to wireless networks as a result of digital dividends varies among countries.

While digital dividends provide additional capacity to wireless networks 101, the frequencies associated with these digital dividends may be prone to interference from existing infrastructure and technologies. More specifically, interference may sometimes be caused by a wired network 102 operating in the vicinity of the wireless network 101. For example, interference in the wireless network 101 may be caused by a specific component, fault or system in the wired network, which may be referred to as an "interference source" 121. The interference source 121 may, for example, be a defect in the wired network 102 which allows leakage of a signal. For example, in some embodiments, the wired network 102 may be a cable network. Cable networks often use radio frequency (RF) signals transmitted over cables to provide television, data, or voice services to customers. Sometimes, such signals may leak from the cable network. That is, the wired network 102 (e.g. the cable network) may produce a wireless signal which may be an unwanted signal which interferes with the wireless signals of the wireless network 101. Such unwanted signals are referred to as interference. The defect that causes the interference (i.e. the "interference source 121") may, for example be a wire fault (such as a wire that has been damaged e.g. the shielding may be broken), a malfunctioning component, a loose connector, etc.

Such interference may have existed when the frequencies associated with the digital dividend were used for their prior purpose (such as for analog television), but may not have been as great a concern when used for the prior purpose. When these frequencies were used for over-the-air (OTA) analog television delivery, interference may have resulted in a degraded television signal on a television, but the user of the television would not likely be able to ascertain the cause of the interference since there may be many causes associated with a degraded signal. Thus, while such interference issues may have existed in the past, they may have largely been uncorrected. However, when such frequencies are now being used for wireless communications on the wireless network 101, such interference issues may result in degraded performance of the wireless network device and even dropped calls. In such systems, correction of interference issues may be desirable.

It will be appreciated that interference caused by a wired network 102 is not, necessarily, only a concern for wireless networks 101 that rely on digital dividend frequencies. Other frequencies that are not, necessarily, digital dividend frequencies may also be affected. Often, the problem arises when a wireless network 101 and a wired network 102 in the vicinity of the wireless network 101 operate over the same or similar frequencies. Since many wired networks (such as cable networks) operate using relatively low frequency RF signals, such interference may be caused for wireless networks 101 operating over similarly low frequencies. For example, cable networks often operate over frequencies that are 1 GHz or less. Thus, wireless networks 101 operating over similar frequencies may experience interference from such cable networks. It will be appreciated that the capabilities of cable networks vary and that the capabilities of cable networks are often expanding. Therefore, such interference may be detected when cable network are operating over higher frequencies and wireless network 101 is also operating over such frequencies.

In the example being discussed, the wireless network 101 utilizes a frequency band which may experience interference from the wired network 102 since the wired network operates over similar frequencies. By way of example, it has been determined that a wireless network 101 utilizing the 700 MHz LTE band may experience interference caused by a wired network 102 operating in the vicinity of the wireless network 101 in at least some jurisdictions. For example, at least some American cable network infrastructure may cause interference to wireless networks 101 using the 700 MHz LTE band.

It is expected to be the same in Canada as the same cable technology is used as in the United States. By way of further example, it is known that, in at least some European countries, existing cable infrastructure may interfere with wireless networks utilizing LTE bands. The preceding countries are identified as examples only and this listing of countries is not meant to be comprehensive.

As illustrated in FIG. 1, the architecture of the example wireless network may be a System Architecture Evolution (SAE)-based architecture. An SAE-based architecture is one that uses the core network architecture of the 3GPP LTE wireless communication standard. The wireless network 101 includes a radio access network which, in the example illustrated, is an Evolved Universal Mobile Telecommunications System (UMTS) Terrestrial Radio Access Network 130, which may be abbreviated as E-UTRAN.

As illustrated, the wireless network 101 includes a plurality of nodes 106 within the radio access network. These nodes 106 are, in at least some embodiments, Evolved Node B nodes 106, which may also be referred to as Evolved Universal Terrestrial Radio Access (e-UTRAN) Node B nodes 106. Evolved Node B is sometimes abbreviated as eNodeB or eNB and is referred to as eNB in the example wireless network 101 of FIG. 1. The nodes 106 are hardware components which are connected with the mobile phone network that communicates with the mobile communication devices 104. The nodes 106 may also be referred to as access points or base stations.

The wireless network 101 includes multiple nodes 106. In the example illustrated, three eNodeB nodes are illustrated. In practice the number of nodes 106 may be much greater. The number of nodes that are required will depend on the coverage area of the wireless network 101, the number of mobile communication devices 104 operating in the wireless network 101 and the quantity of bandwidth expected to be consumed by such mobile communication devices 104. The nodes 106 may have different coverage areas so that when a mobile communication device 104 is located at a given location, it may communicate with one or more of the nodes 106 but may be outside of the coverage area of at least one other of the nodes 106.

The nodes 106 are communicably connected to one another. In the example illustrated, an X2 interface 112 exists between the nodes 106. This interface 112 is a direct communication link between the nodes 106. This interface 112 may be used to handle control plane and user plane traffic. For example, it may be used during handover (e.g. as the mobile communication device 104 travels from an area in which it communicates with one node 106 to an area where it communicates with a different node 106).

The wireless network 101 includes other components which may, for example, facilitate communications with the Internet 117 or with telephones connected to a public switched telephone network. In the example illustrated, the nodes 106 are connected to an Evolved Packet Core (EPC) 150 which may also be referred to as a System Architecture Evolution (SAE) core. The EPC 150 includes a Mobility Management Entity (MME) 152. The MME 152 is a control node for the wireless network 101. In at least some embodiments, the MME 152 is responsible for tracking mobile communication devices 104. The MME 152 may also, in at least some embodiments, authenticate mobile communication devices 104. The MME 152 may provide other functions apart from those discussed herein.

The EPC 150 also includes one or more gateways. In the example illustrated, a Serving Gateway (SGW) 154 is illustrated. The SGW 154 may, among other things, forward and route user data packets. While not specifically illustrated, the EPC 150 may also include a Packet Data Network Gateway (PGW or PDNGW). The PGW provides connectivity from the mobile communication devices 104 to external packet networks and acts as a point of exit and entry of traffic for the mobile communication devices 104. For example, the PGW may connect to the Internet 117 and may provide the mobile communication devices 104 with access to the Internet. In the example illustrated, the SGW 154 is illustrated to provide the functions of both the PGW and the SGW. More particularly, the SGW 154 provides a connection to the Internet 117.

The EPC 150 is connected to the radio access network. More particularly, the nodes 106 are connected to the EPC 150. Thus, the nodes 106 act as access points which provide radio access to the mobile communication devices 104 and the EPC 150 is engaged for various tasks such as management and communication-related tasks.

Figure 6:
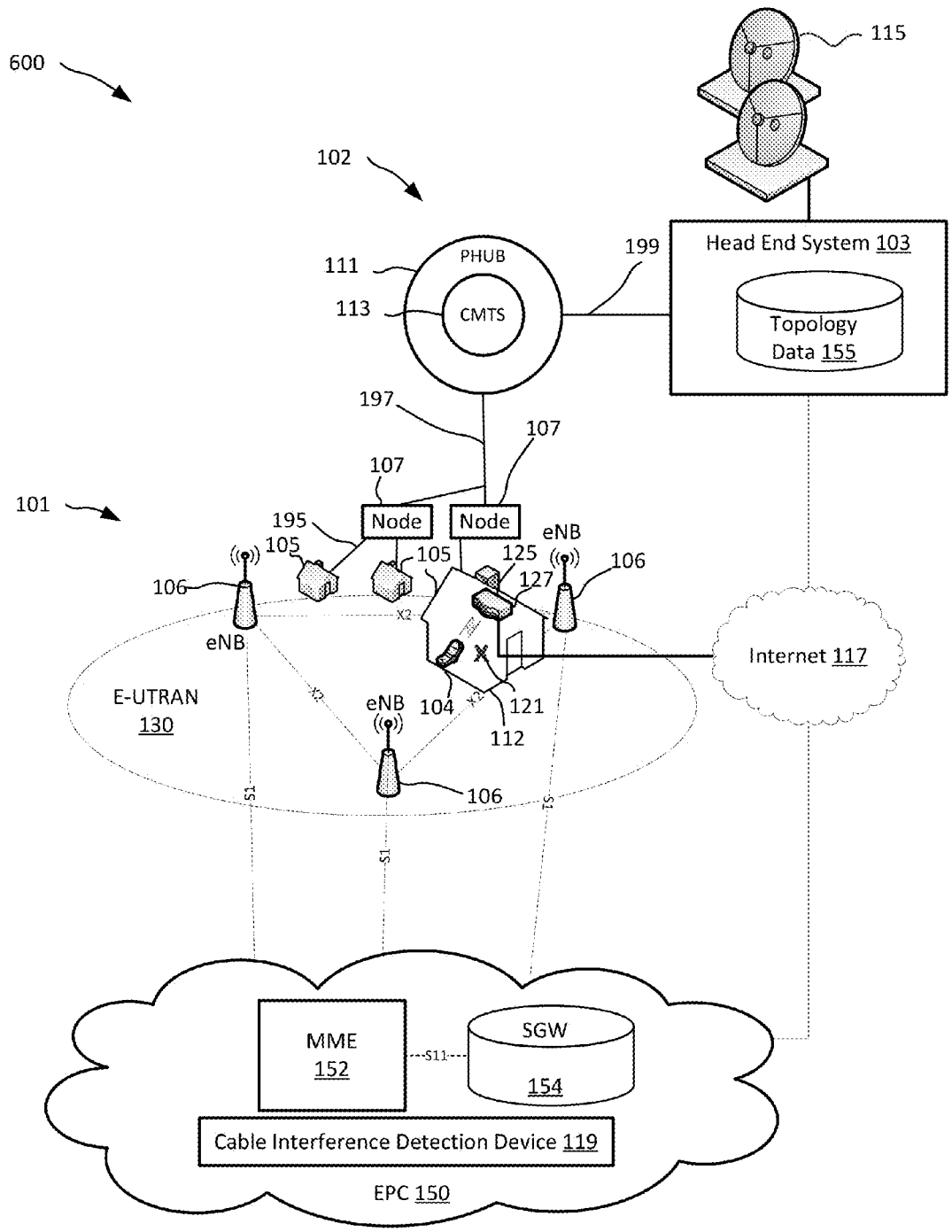
FIG. 6 is a block diagram of an example operating environment which includes a femtocell in accordance with example embodiments of the present disclosure.

In at least some embodiments, the wireless network 101 may be configured to identify an interference source 121 which exists in the wired network 102 which causes interference with in the wireless network 101. More particularly, in at least some embodiments, the wireless network 101 may include a cable interference detection device 119 which is configured to detect such interference. In at least some embodiments, the cable interference detection device may operate by utilizing equipment deployed in the network to assist in the interference detection, such as mobile communication devices 104 (and/or a femtocell 127 (see FIG. 6)). At least some of the mobile communication devices 104 can act as interference receiving devices 125. More particularly, as will be explained in greater detail below, the mobile communication devices 104 may report back to the cable interference detection device 119 when they detect a wireless signal that is a potential interference signal. That is, when possible interference is detected by a mobile communication device 104 (i.e. when the received signal is not recognized as a wireless signal associated with the wireless network 101), a representation of the wireless signal (also known as a signal signature) causing the interference may be provided to the cable interference detection device 119 for further analysis. Thus, the mobile communication devices 104 act as interference receiving devices 125 by reporting received interference to the cable interference detection device 119, where the interference may be further analyzed.

Figure 2:
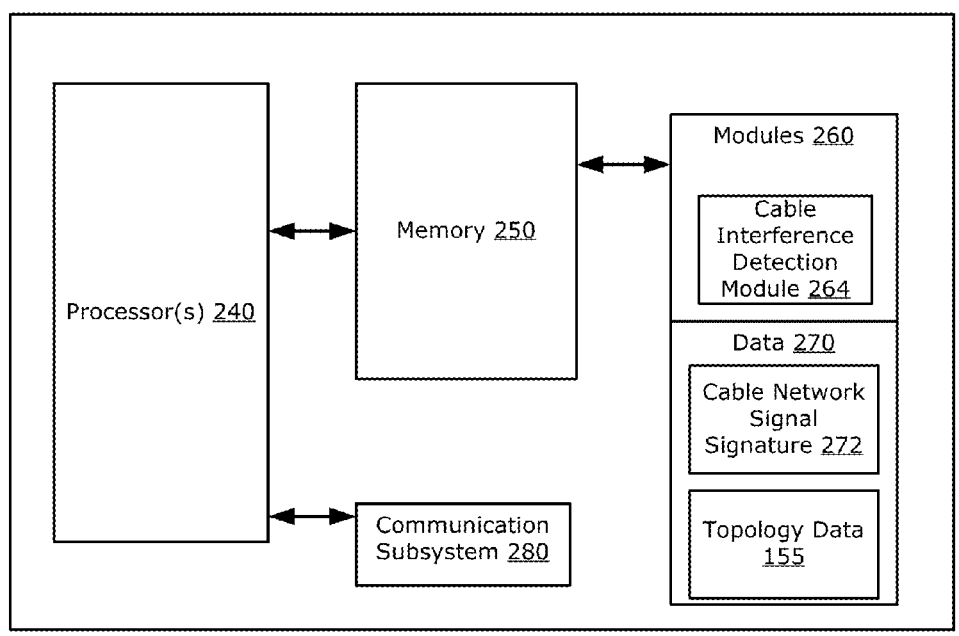
FIG. 2 is a block diagram of an example cable interference detection device in accordance with example embodiments of the present disclosure.

The cable interference detection device 119 may compare the representation of the interfering wireless signal (i.e. the signal signature of the interference signal) with a cable network signal signature 272 (FIG. 2). The cable network signal signature may, for example, be stored in memory associated with the cable interference detection device 119. The cable network signal signature 272 identifies a format associated with signals in the wired network 102 (which is a cable network in the example). Based on the cable network signal signature, it is possible to determine whether the source of the interference is the cable network or whether it is another source unrelated to the cable network.

The cable interference detection device 119 is, in the example embodiment, provided in the core infrastructure of the wireless network 101. More particularly, in the example illustrated, it is provided in the EPC 150. It will, however, be appreciated that the cable interference detection device 119 may be provided in other wireless network components in other embodiments. For example, in some embodiments, the cable interference detection device may be provided within one or more of the nodes 106. For example, each node 106 may include a cable interference detection device which is used to identify interference in the specific geographic area serviced by that node 106. In further embodiments, the cable interference detection device 119 may be located in a server connected to one or more EPC 150 systems.

As will be described in greater detail below with reference to FIG. 2, the cable interference detection device 119 may include one or more processors 240 and memory 250 which may, for example, be processors 240 and memory 250 associated with an EPC 150, a node 106, or another network component that provides other functionality. The memory may include processor-executable instructions that, when executed, causes the processor to perform the cable interference detection device functions described herein Accordingly, the node 106 and/or EPC 150 may in at least some embodiments, include one or more processors and one or more memory elements storing processor executable instructions which implement the functions of the cable interference detection device 119. In at least some embodiments, the node 106 and/or EPC 150 operate under stored program control and execute the processor executable instructions stored on the memory element(s).

An example cable interference detection device 119 will be described in greater detail below with reference to FIG. 2 and functions or features of the cable interference detection device 119 will be described in greater detail below, including the discussion of FIG. 4 below.

Example Wired Network

In addition to the wireless network 101, the example operating environment of FIG. 1 also includes an example wired network 102. The wired network 102 may be a service provider network which provides one or more services to subscribers in the wired network 102. For example, in some embodiments, the wired network 102 may be a content delivery system which is configured to deliver content from a content source system to a content destination. The content delivery system may, for example, be a broadcast television system which delivers television content such as broadcast television programs.

The wired network 102 may, in some embodiments, support an Internet service provider (ISP) to allow a plurality of subscribers connected to the wired network 102 to access the Internet 117. For example, a modem associated with a subscriber may be used to send and receive data packets to online servers or systems. In some embodiments, the ISP system may be a cable Internet system which is configured to provide broadband Internet access over a cable television infrastructure. For example, in at least some embodiments, the wired network 102 may be configured to deliver services according to the Data Over Cable Service Interface Specification (DOCSIS). DOCSIS is an international telecommunications standard that permits high-speed data transfer to occur over cable TV (CATV) infrastructure. Accordingly, in at least some embodiments, components of the wired network 102 described below may be configured to operate according to the DOCSIS specification. It will be appreciated that other communications specifications may be used in other embodiments.

In some embodiments, the wired network 102 may be configured for providing telephone services. That is, the wired network 102 may provide telephone services to a plurality of subscribers connected to the wired network. The telephone services may, in some embodiments, be voice over internet protocol (VOIP) services, which may be provided over cable network infrastructure, for example.

It will be appreciated that the wired network 102 may, in at least some embodiments, provide a plurality of subscription based services. For example, the wired network 102 may provide any combination of Internet, telephone, television, or other services.

The wired network 102 includes back-end systems which provide services to subscribers. In the example illustrated, the back-end system is referred to as a head end system 103. The specific configuration of the back-end systems will depend on the nature of the services provided by the wired network 102 and on the specific wired network 102 technology.

For example, as noted above, the wired network 102 may be configured for providing content delivery services to subscribers. In some embodiments, the wired network 102 may be configured to deliver television programming. In at least some such embodiments, the head end system 103 is configured to deliver content to a customer equipment (CE) device 105, such as a receiver. A receiver may be connected to a media player, such as a television, on which content received at the receiver may be displayed. In at least some example embodiments, the receiver, or parts thereof, may be internal to a media player (e.g. the television). For example, a receiver may be a component of a television which is included in the television at the time of manufacture. In other embodiments, a receiver may be an external receiver which is connected to the media player (e.g. the television) through a wired or wireless transport medium.

One or more of the receivers which are serviced by the head end system 103 may, in at least some example embodiments, be a set top box. A set top box is a device which connects to a television (or other display) and an external source of signal, converting the signal into a format, such as component video or HDMI signals which may be displayed on the television (or other display). The term set top box includes devices which do not, necessarily, sit on top of a television. That is, the term set top box may refer to any device which is external to a television (or other display) and which receives an external signal, converts the signal into a different format suitable for the display device. The receivers may also take other forms including, for example, a gaming console, a cable card, a personal computer, a tablet device, a smartphone, etc. The receivers may be any electronic devices at which content from a head end system 103 may be received.

Where the wired network 102 is configured to deliver content to subscribers, the head end system 103 may include or connect to a content acquisition system 115. The content acquisition system 115 of FIG. 1 is illustrated as a plurality of satellite receivers. Such satellite receivers may be configured to receive content from one or more satellites. In various embodiments, the content acquisition system 115 may be configured to receive content through other means instead of, or in addition to, the satellite receivers. For example, the content acquisition system 115 may include one or more antennas which receive radio frequency signals, such as signals transmitted by a terrestrial based broadcaster. In at least some embodiments, the content acquisition system 115 may be configured to receive content through a network, such as the Internet 117. In at least some embodiments, the content acquisition system 115 may be configured to receive content though a wired transport medium such as, for example, a cable. The cable may, in some example embodiments, include a coaxial cable and/or a fibre optic cable. The content received through the content acquisition system 115 may include, for example, broadcast content which may be received in streaming fashion from one or more television networks. Such content may be referred to as source broadcast streams.

In order to prevent unauthorized access to content (such as source broadcast streams), such content may be scrambled or otherwise encrypted. The head end system 103 may receive scrambled and/or encrypted content (such as encrypted source broadcast streams). Such encrypted and/or scrambled content may, for example, be received at the content acquisition system 115. The head end system 103 may be configured to decrypt or decode such content.

As also noted above, in some embodiments, the wired network 102 may be configured to provide Internet services to subscribers. In some such embodiments, the head end system 103 may be configured to provide such Internet services. More particularly, the head end system 103 may connect to the Internet 117 and may include or be connected to subsystems which may be useful for providing Internet services to subscribers. Such subsystems may, for example, include a domain name server (DNS), routers, and other subsystems.

In embodiments in which the head end system 103 is configured to provide Internet services, the head end system 103 may provide the Internet services to customer equipment (CE) device 105 which may be referred to as modems. For example, a subscriber may be associated with a cable or DSL modem which sends data to and receives data from the Internet 117 via the back end systems of the wired network 102 (such as the head end system 103).

In some embodiments, the wired network 102 may be configured to provide telephone services to subscribers. Accordingly, the head end system 103 may be configured to support such telephone services. For example, the head end system 103 may be connected to the public switched telephone network (PSTN). In embodiments in which the head end system 103 provides VoIP telephone services, the head end system 103 may be configured to map a phone number associated with a subscriber to an IP address associated with customer equipment device 105 for that subscriber. For example, the phone number may be mapped to an IP address for a telephone associated with the subscriber.

The head end system 103 may be owned and/or operated by a service provider such as a content service provider (e.g. a television service provider), a telephone service provider and/or an Internet service provider, who may also own, operate and/or maintain other components of the wired network 102. In some embodiments, the service provider operating the wired network 102 may be the same service provider who operates the wireless network 101. However, in other embodiments, these operators may be different.

In the example embodiment illustrated, the back end system which provides the services is referred to as a head end system 103 and the system for which the services are provided is referred to as customer equipment (CE) device 105. However, these systems may be referred to using other terminology. For example, the head end system 103 may be referred to as a service provider system or a back end system. The customer equipment device 105 may be referred to as a modem and/or a receiver in at least some embodiments. Since the customer equipment devices 105 are typically located in locations associated with a subscriber such as, for example, the home of a subscriber, the customer equipment devices 105 may be referred to as Customer Premises Equipment (CPE).

The customer equipment devices 105 may be owned by the subscriber or the customer equipment devices 105 may be owned by another party such as, for example, the service provider. Thus, use of the term customer equipment does not require ownership of the equipment by the customer. Rather, the customer equipment device is hardware and associated computer software that is associated with a subscriber's location and which is typically located in the subscriber's premises.

Customer equipment devices 105 are illustrated in FIG. 1 using houses to illustrate that the customer equipment devices 105 may be distributed among different households associated with different subscribers. However, it will be appreciated that a single household may, in some embodiments, include multiple customer equipment devices 105 and that customer equipment devices 105 need not, in all embodiments, be located within houses.

The customer equipment devices 105 are connected to the head end system 103 through wired transport mediums 195, 197, 199. The wired transport mediums 195, 197, 199 may, in various embodiments, include copper wire, or other wires, such as coaxial cable and/or may include an optical transport medium, such as fibre optic cables.

As illustrated in FIG. 1, the head end system 103 may not be connected directly to the customer equipment devices 105. In at least some embodiments, one or more intermediary systems or devices may connect the head end system 103 to the customer equipment devices 105. For example, in at least some embodiments, a hub 111 (which may also be referred to as a distribution hub) may connect to the head end system 103. The hub 111 may be connected to the head end system 103 through a transport medium 199. In at least some embodiments, the transport medium 199 connecting the head end system 103 to the hub 111 may be a high bandwidth transport medium, such as a fibre optic cable.

In the example embodiment illustrated, the wired network 102 includes a single hub 111. However, in other embodiments, the wired network 102 may include a greater number of hubs. The exact number of hubs in the wired network 102 will depend, in part, on the quantity of customer equipment devices 105 serviced by the wired network 102. In the example embodiment illustrated, the hubs 111 are primary hubs (PHUB).

Each hub 111 may service a set of wired network nodes 107. For example, each hub 111 may function to deliver content to a specific wired network node 107, or set of wired network nodes 107. In the example embodiment illustrated, the hub 111 is connected to and services two wired network nodes 107. However, in practice, the number of nodes serviced by each hub 111 may be much greater. Transport mediums 197 may connect the hubs 111 to the wired network nodes 107. In at least some embodiments, the transport mediums 197 connecting the hubs 111 to the wired network nodes 107 are high bandwidth transport mediums, such as a fibre optic cables.

The wired network nodes 107 are different components than the nodes 106 of the wireless network 101. The wired network nodes 107 of the wired network 102 provide some functions and features which are analogous to the functions and features provided by the nodes 106 of the wireless network 101, but some of the functions are features of the wired network nodes 107 of the wired network 102 are different than the nodes 106 of the wireless network 101. Thus, different reference numerals have been used to distinguish the wired network nodes 107 from the nodes 106 of the wireless network 101.

Each wired network node 107 may be connected to a set of customer equipment devices 105. That is, each wired network node 107 may connect the head end system 103 (via the hub 111) to one or more of the customer equipment devices 105 connected to that wired network node 107. Each wired network node 107 may service customer equipment devices 105 in a specific geographic area.

Transport mediums 195 may connect the wired network nodes 107 to the customer equipment devices 105. The transport mediums connecting the wired network nodes 107 to the customer equipment devices 105 may, in some embodiments, include copper cable (e.g. coaxial cable).

Various components of the wired network 102 and the customer equipment devices 105 may define a topology for the wired network 102. The topology for the wired network 102 defines the form of interconnections of the components of the wired network 102 and the customer equipment devices 105 and the geographic location of components of the wired network 102. That is, the term topology is used to describe the location of components in the wired network 102 and may define the manner by which a customer equipment device 105 connects to the head end system 103 and/or other parts of the wired network 102.

In at least some embodiments, the wired network 102 may contain information about (i.e. track) this topology. For example, the wired network 102 may, in at least some embodiments, store topology data 155 specifying the location of network components (e.g. the specific wired network nodes 107 and/or hubs 111 and/or termination systems 113 and/or transport mediums 195, 197, 199) which connect a customer equipment device 105 to the head end system 103.

The topology data 155 may be stored in memory of the wired network 102. In some example embodiments, the memory includes non-volatile memory, such as flash memory. In at least some example embodiments, the memory includes a solid state drive (SSD) and/or a magnetic storage, such as a hard disk drive (HDD). Other types of memory may be used instead of or in addition to those listed above. In the example embodiment illustrated, the topology data 155 is stored in memory of the head end system 103. However, in other embodiments, the topology data 155 may be stored elsewhere.

The wired network 102 may include one or more termination systems 113. The termination systems 113 may be located in the head end system 103 and/or in a hub 111 (such as a primary hub (PHUB) and/or a secondary hub (SHUB)). In the embodiment illustrated, the termination systems 113 are located in the hubs 111.

In at least some embodiments, the termination systems 113 are cable modem termination systems (CMTS). A CMTS is a component which is used to provide high speed data services to cable subscribers. In the example embodiment illustrated, the CMTS is used to provide high speed content delivery services. For example, the CMTS may be used to deliver content, such as television programming, or to provide Internet access to the customer equipment devices 105, such as modems and receivers. The CMTS may be configured to service a specific set of nodes (e.g. to send and receive data to these nodes), thereby servicing the customer equipment devices 105 connected to those nodes.

The CMTS may be used to provide multiple services to subscribers. That is, the CMTS may be used by a system operator to provide a plurality of services, such as data (e.g. Internet), voice (e.g. phone), and/or video (e.g. television) services to subscribers.

As noted above, the wired network 102 may include an interference source 121. In the example illustrated, the interference source 121 is a wire fault. An example interference source 121 which is a wire fault has been shown in a wired transport medium 195 in FIG. 1 by the symbol "x". The wire fault may, for example, be a damaged cable. It will be appreciated that the interference source 121 could be something other than a wire fault. For example, a faulty network component such as a faulty wired network node 107 could act as the interference source 121.

As will be discussed in greater detail below, the cable interference detection device 119 may be used to detect the existence of an interference source 121 such as a wire fault and, in at least some embodiments, to detect the location of the interference source 121. More particularly, since the interference source 121 is located in a geographic area within the coverage area of the wireless network 101, it may be detected using components of the wireless network 101.

In at least some embodiments, one or more components of the wired network 102 may connect to one or more components of the wireless network 101. For example, a wired network component such as the head end system 103 may, in at least some embodiments, connect to the cable interference detection device 119 to allow the wired network to communicate with the cable interference detection device 119. In the example illustrated, this connection is via a network, such as the Internet 117. More particularly, the head end system 103 and the EPC 150 (which in the example includes the cable interference detection device 119) both connect to the Internet 117 to allow these systems to send and receive data to one another via the Internet 117. In other embodiments, there may be no such connection between the wired network 102 and the wireless network 101.

The connection between a wired network component (such as the head end system 103) and the cable interference detection device 119 may, in at least some embodiments, allow the wired network 102 to provide the topology data 155 to the cable interference detection device 119. The connection may also, for example, allow the cable interference detection device 119 to inform the wired network component when an interference source 121 is detected in the wired network 102. In at least some embodiments, the cable interference detection device 119 may provide the wired network 102 with location information indicating the location of the interference source 121.

While FIG. 1 illustrates an embodiment in which the cable interference detection device 119 is connected with the wired network 102 via the Internet, in other embodiments, the connection between the wired network 102 and the cable interference detection device 119 may be more direct. For example, the connection may not be via the Internet 117; the cable interference detection device 119 may be connected to the wired network via a direct wired or wireless connection.

It will be appreciated that the wired network 102 of FIG. 1 is one possible example of a wired network 102 and variations are possible. For example, any of the features of any of the systems included in the head end system 103 may be provided by other systems and any one or more of these features may be provided by other systems or subsystems of the head end system 103 not specifically discussed herein. More particularly, the head end system 103 may not be physically or logically divided in the manner illustrated in FIG. 1. In at least some embodiments, components of the head end system 103 may be physically or logically separated from one another. In at least some embodiments, the head end system 103 may be physically separated and may, for example, include a super head end system and one or more regional or local head end systems. The super head end system and/or the regional or local head end systems may separately or collectively perform some of the functions described above with reference to FIG. 1.

It will also be appreciated that the wired network 102 may include other components not specifically illustrated in FIG. 1 or discussed above and that at least some of those additional components may also act as an interference source. By way of example, while a PHUB was described above, the wired network 102 may also include secondary hubs (SHUB).

In at least some example embodiments, the head end system 103 may be a modular solution in which various functions or features described herein are provided by various modules. Such modules may, for example, be rack mounted electrical devices and may interconnect with one another to collectively provide the functions of the head end system 103.

In at least some embodiments, one or more of the modules, features, systems or subsystems described herein may contain one or more processors and a memory having computer readable instructions stored thereon. The computer readable instructions may be executable by the processors and may cause the processors to provide functions described herein.

Example Cable Interference Detection Device

Reference is next made to FIG. 2 which illustrates an example cable interference detection device 119 in block diagram form. Although the cable interference detection device 119 is shown to be implemented as a single server, it will be understood that the functions of the cable interference detection device 119 may be implemented across a multitude of network servers, or other suitable architecture.

In at least some embodiments, the functions of the cable interference detection device 119 may be implemented, in whole or in part, by way of a processor 240 which is configured to execute software modules 260 stored in memory 250. In the embodiment of FIG. 2, the cable interference detection device 119 includes a controller comprising one or more processors 240 which control the overall operation of the cable interference detection device 119. The processor 240 interacts with one or more communication subsystems 280 to perform communication functions, with other systems, servers and/or devices such as the mobile communication device 104 and, in at least some embodiments, a system associated with the wired network 102 such as the head end system 103 as discussed above.

The cable interference detection device 119 also includes memory 250 which is connected to the processor 240 for receiving and sending data to the processor 240. While the memory 250 is illustrated as a single component, it will typically be comprised of multiple memory components of various types. For example, the memory 250 may include Random Access Memory (RAM), Read Only Memory (ROM), a Hard Disk Drive (HDD), Flash Memory, or other types of memory. It will be appreciated that each of the various memory types will be best suited for different purposes and applications.

The cable interference detection device 119 may store data 270 in a data area of the memory 250. The data 270 may be of various types. In at least some embodiments, the data 270 includes topology data 155. As noted in the discussion of FIG. 1 above, the topology data 155 may specify the locations of components of the wired network 102 and/or the wireless network 101 such as, for example, the specific wired network nodes 107 and/or hubs 111 and/or termination systems 113 and/or transport mediums 195, 197, 199. The topology data 155 may, in at least some embodiments, be provided to the cable interference detection device 119 from a component of the wired network 102. For example, the head end system 103 may, in at least some embodiments, provide the topology data 155 to the cable interference detection device 119. The topology data 155 may be provided periodically (i.e. to account for any possible changes in the topology of the wired network) or responsive to changes in the topology of the wired network.

It will be appreciated that the topology data 155 used by the cable interference detection device 119 may, in at least some embodiments, specify location information associated with the wireless network 101 as an alternative to, or in addition to, the information associated with the wired network 102. That is, in some embodiments, the interference source may be located without relying on information about the location of wired network components. Information about the location of components associated with the wireless network 101 may provide sufficient information to locate the source of the interference. For example, the location of nodes 106 which the mobile communication devices 104 are communicating with will provide information as to the location of the interference source. Similarly, global positioning system (GPS) data obtained from a GPS sensor provided on the mobile device 104 may also be used in locating the source of the interference.

The data 270 may also include one or more cable network signal signature 272. Each cable network signal signature 272 identifies a format associated with signals in the wired network 102 (which is a cable network in the example). Based on the cable network signal signatures, it is possible to determine whether a wireless signal has characteristics that are associated with the wired network 102. The cable network signal signature 272 is, in at least some embodiments, a frequency domain signature. That is, the cable network signal signature 272 represents frequency-based characteristics of signals of the wired network 102.

The cable network signatures are determined by the type of Radio Signal format carried on the wired network. An analog television signal conforming with the NTSC standard will have one signature. A digital QAM signal used to convey digital video signals will have a different signature. A DOCSIS 3.1 OFDM signal will have yet a different signature. Each of these signatures may be captured with the help of test equipment, such as spectrum analyzers, to convey the nature of these signals in the frequency domain. Energy levels within the wired signal types will be a function of frequency which will differ from signals used by the wireless network. This difference can be exploited to determine that a source of interference to the wireless network is a defective wired network. The signature may also depend on the dwell time over which the energy capture is performed as well as the resolution bandwidth of the signature capture detection equipment. Preferably, the signature capture equipment is configured to replicate as closely as possible the receiver characteristics of the mobile device 104 or femtocell. The interference detection device matches will then be much closer between known cable signal signatures and interference signal signatures, improving the confidence in detecting interference caused by a wired network. After the signature(s) of the cable network are captured using this technique, they are stored as the cable network signal signature 272 of FIG. 2.

The processor 240 may operate under stored program control and may execute software modules 260 stored on the memory 250. The software modules 260 may include a cable interference detection module 264 which may be configured to identify an interference source 121 associated with the wired network 102. More particularly, the cable interference detection module 264 may include processor-executable instructions which, when executed, cause the cable interference detection module 264 to perform the steps of the method 450 and/or the steps of the method 500 described with reference to FIGS. 4 and 5 below.

It will be appreciated that the cable interference detection device 119 as illustrated in FIG. 2 is an example of one possible architecture. In at least some example embodiments, servers may be used which are of different configurations and/or functions.

Example Mobile Communication Device

Figure 3:
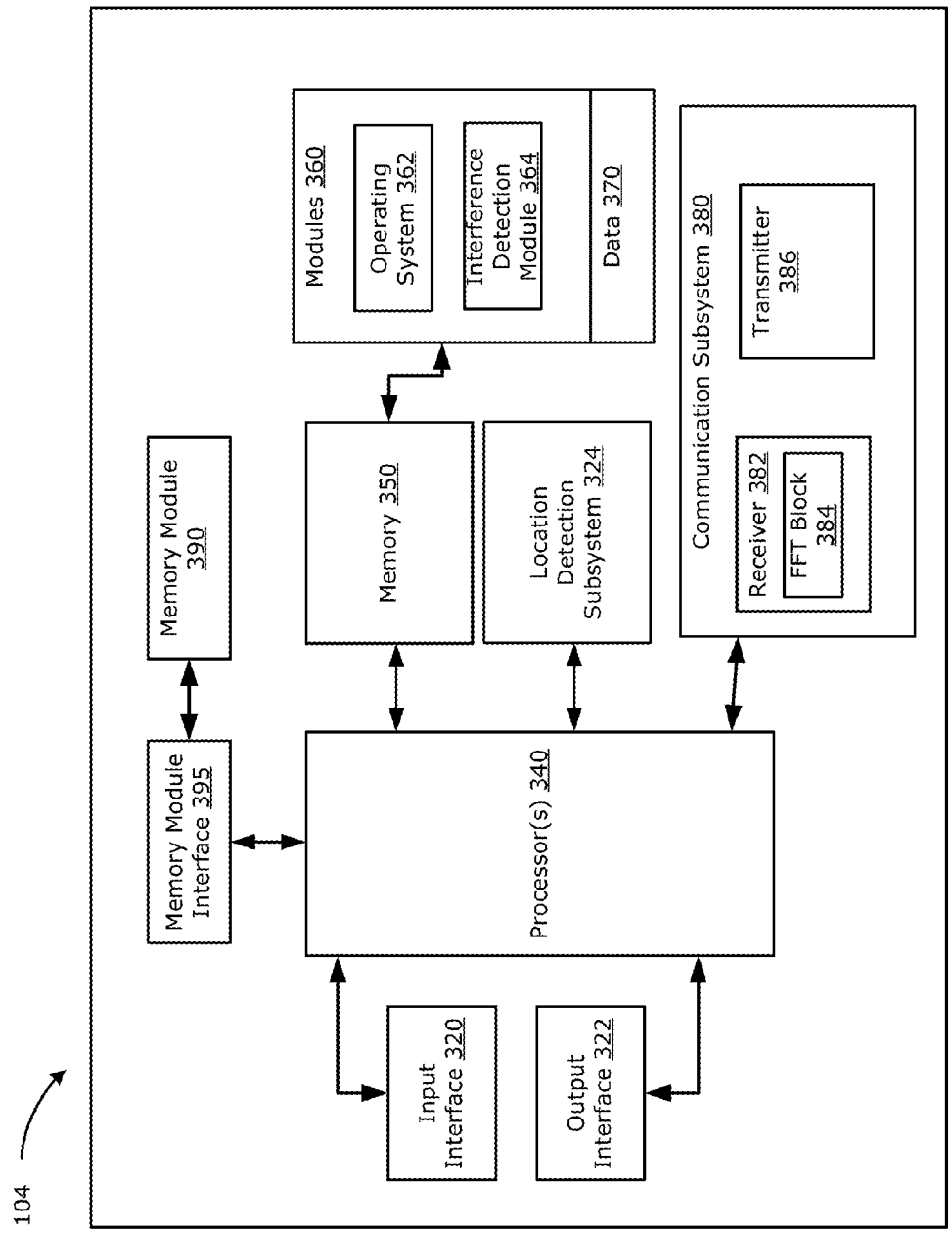
FIG. 3 is a block diagram of an example mobile communication device in accordance with example embodiments of the present disclosure.

Reference is next made to FIG. 3 which illustrates an example mobile communication device 104 in block diagram form. In the illustrated example embodiments, the mobile communication device 104 is capable of voice and data communications with other devices, systems and servers, for example, via the wireless network 101.

The mobile communication device 104 includes a controller which includes one or more processors 340 which control the overall operation of the mobile communication device 104. The processor 340 may be communicably coupled with device subsystems including one or more input interfaces 320 (such as a keyboard, control buttons, a microphone, a touchscreen display, a mouse, a trackpad, a microphone and/or other input interfaces), one or more output interfaces 322 (such as a display and/or a speaker), memory 350 (which may include multiple memory components of various types such as flash memory, random access memory (RAM), read only memory (ROM), a hard disk drive (HDD), a solid state drive (SSD), or other types of memory), one or more communication subsystems 380 for communicating wirelessly with other systems, servers and/or electronic devices via the wireless network 101, and a location detection subsystem 324 for determining the geographic location of the mobile communication device 104. The processor 340 may be communicably coupled with other device subsystems not specifically described herein.

The location detection subsystem 324 is configured to determine the geographic location of the mobile communication device 104. For example, the location detection subsystem 324 may determine the location of the mobile communication device 104 using a coordinate system, such as latitude and longitude. The location of the mobile communication device 104 may be output from the location detection subsystem 324 as location information. This location information may, for example, be provided to the processor 340 for processing and/or analysis.

In at least some embodiments, the location detection subsystem 324 is a global position system (GPS) which generates location information which is GPS data. GPS utilizes satellites to determine location.

The location detection subsystem 324 may, in other embodiments, utilize other techniques (instead of or in addition to GPS) to determine the location of the mobile communication device 104. For example, triangulation techniques which utilize components of the wireless network 101 may be used to determine the location of the mobile communication device 104. For example, triangulation techniques may utilize the locations of a plurality of nodes 106 (FIG. 1) that are in communication with the mobile communication device 104 to determine the location of the mobile communication device 104.

As will be discussed in greater detail below, the location detection subsystem 324 may be used to assist in identifying the location of an interference source 121. More particularly, the location at which an interference signal is observed may be used to identify the location of an interference source 121.

In at least some embodiments, the location detection subsystem 324 (or another subsystem) may generate location information which includes altitude information. Such altitude information may be included in addition to latitude and longitude information. The altitude information may, for example, be generated by an altimeter. In at least some embodiments, such altitude information may be used to assist in identifying the location of an interference source 121. More particularly, such altitude information may be particularly useful when attempting to locate an interference source 121 in a multi-level structure such as a high-rise building.

In at least some example embodiments, the mobile communication device 104 may also include one or more removable memory modules 390 and a memory module interface 395. The mobile communication device 104 may access the wireless network 101 via the memory module 390, which may include one or more physical universal integrated circuit cards (UICC), which may also be referred to as a subscriber identity module (SIM) card. The memory module 390 may be inserted in or connected to the memory module interface 395 of the mobile communication device 104.

The mobile communication device 104 may store data 370 in a data area of the memory 350. The data 370 may be of various types and may include service data, application data, etc.

The processor 340 may operate under stored program control and may execute software modules 360 stored on the memory 350. The software modules 360 may be comprised of, for example, operating system 362 software, and one or more additional modules such as an interference detection module 364 to carry out specific functions of the mobile communication device 104.

The operating system 362 is software that manages the mobile communication device 104 components (such as the input interface 320, the output interface 322, the communication subsystem(s) 380, etc.) and provides a platform for the other software modules 360 such as the interference detection module 364. The operating system 362 may be Microsoft Windows OS™, iOS™, Linux™, UNIX™, Android™ or any other operating system 362 having the necessary capabilities for implementing the functions described herein.

At least one of the communication subsystems 380 is configured to communicate over the wireless network 101 (FIG. 1). Accordingly, the communication subsystem 380 may be configured for communications of the type described above with reference to FIG. 1. For example, in at least some embodiments, the communication subsystem 380 is configured to operate according to a 3GPP standard. For example, in at least some embodiments, the communication subsystem 380 may be configured to communicate over an LTE network. The communication subsystem 380 may be configured to communicate using one of the bands discussed above with reference to FIG. 1. For example, in at least some embodiments, the communication subsystem 380 may be configured to allow for communications over the 700 MHz LTE band.

The communication subsystem 380 includes a receiver 382. The receiver 382 is configured to detect (i.e. to receive) wireless signals in the vicinity of the mobile communication device that are within a pass-band of the receiver 382.

More particularly, the mobile communication device 104 may be configured to operate over one or more bands (such as LTE bands). That is, one or more receivers 382 associated with the mobile communication device 104 may be configured to operate a specific band or set of bands. The bands over which the receiver(s) 382 of the mobile communication device 104 are configured to operate may be referred to as the pass-bands of the receiver 382. Mobile communication devices 104 often have receivers 382 that allow such devices to operate over bands apart from those associated with the wireless network 101. That is, even when a mobile communication device 104 subscribes to a wireless network 101 that does not operate over a particular band, the mobile communication device 104 may have a receiver 382 that is configured to allow the device to operate over that band. This functionality may be useful, for example, when the mobile communication device 104 is roaming to allow it to communicate with a different wireless network 101 that may operate over a different band or a different set of bands.

Thus, any wireless signal that is within the pass-band of the receiver 382 may be detected by the mobile communication device 104. Since the pass-bands are configured to allow the receiver 382 to operate within the wireless network 101, a wireless signal associated with the wireless network 101 (i.e. generated by a component of the wireless network 101 such as the node 106) may be detected by the mobile communication device 104. That is, such wireless signals may be passed by the receiver 382 onto other components of the mobile communication device 104 such as the processor 340.

Other unwanted wireless signals (known as interference) may also be received at the receiver 382. If such unwanted signals fall within the pass-band of the receiver 382, they may also be passed by the receiver 382 to other components of the mobile communication device 104 such as the processor 340. As noted in the discussion of FIG. 1 above, such interference may sometimes be caused by interference sources 121 (FIG. 1) included in a wired network 102.

The interference detection module 364 may, in at least some embodiments, be configured to assist in the identification of such an interference source 121 (FIG. 1). To do so, the interference detection module 364 may be configured to perform a method 452 (FIG. 4), 500 (FIG. 5) which will be described in greater detail below.

The receiver 382 may, in at least some embodiments, have a fast fourier transform (FFT) block 384 associated therewith. The fast fourier transform block 384 may be used to obtain a fast fourier transform representation of a received wireless signal. The fast fourier transform may be used to convert a received wireless signal (which may be represented as a wide-frequency signal in the time domain) to a series of brief energy samples in the frequency domain.

The communication subsystem 380 further includes a transmitter 386. The transmitter 386 is used to send uplink traffic to the wireless network 101. That is, while the receiver 382 allows the mobile communication device 104 to receive wireless signals representing data from the wireless network 101, the transmitter allows the mobile communication device to send wireless signals representing data to the wireless network 101.

The communication subsystem 380 includes other components that would be known to a person of skill in the art which are not specifically identified in FIG. 3. By way of example, the inclusion of an antenna would be known to such a person.

It will be appreciated that, in at least some example embodiments, other modules, such as the operating system 362 may perform some or all of the functions of the interference detection module 364. Furthermore, while FIG. 3 uses a single block to illustrate the interference detection module 364, this module could, in practice be divided into multiple modules which may, in at least some embodiments, reside on different devices and/or different components within a device.

Figure 4:
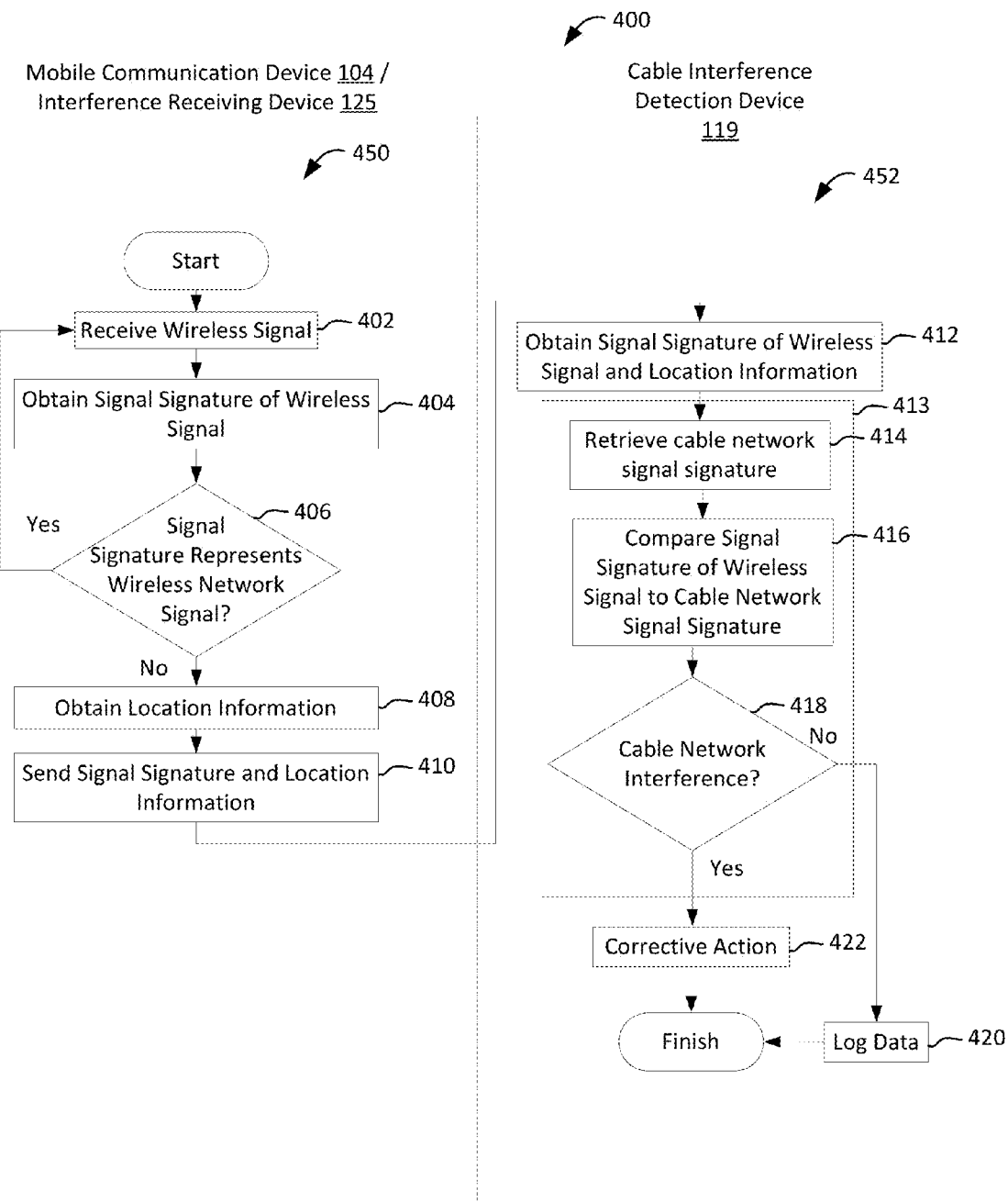
FIG. 4 is a flowchart depicting a method of detecting interference in a wireless network caused by a cable network in accordance with example embodiments of the present disclosure.

Example Method of Identifying an Interference Source Associated with a Wired Network FIG. 4 is a flow chart depicting a method 400 of detecting interference in a wireless network 101. More particularly, the method 400 may be used to detect interference that is caused by a wired network 102 (e.g. the cable network of FIG. 1) operating in the vicinity of the wireless network. The method 400 includes steps which may be performed by an interference receiving device 125 (FIG. 1) such as a mobile communication device 104 (FIG. 3) (or a femtocell 127 (FIG. 6)) and steps which may be performed by a cable interference detection device 119 (FIG. 2).

Accordingly, the method 400 of FIG. 4 includes sub-methods. More particularly, the steps of the method 400 that are performed by an interference receiving device 125 (FIG. 1) such as a mobile communication device 104 (FIG. 3) or a femtocell 127 (FIG. 6) form a first method 450 and the steps of the method 400 that are performed by a cable interference detection device 119 (FIG. 2) form a second method 452. These sub-methods 450, 452 cooperatively perform the method 400. That is, the interference receiving device 125 (FIG. 1) such as a mobile communication device 104 (FIG. 3) or the femtocell 127 (FIG. 6) communicates with the cable interference detection device 119 (FIG. 2) to perform the method 400.

More particularly, the sub-methods 450, 452 may be performed by the processors 340, 240 of the mobile communication device 104 (FIG. 3) (or the femtocell 127 (FIG. 6)) and the cable interference detection device 119 (FIG. 2) respectively, in conjunction with other components of these devices, such as the communication subsystems 380, 280. For example, processor-executable instructions associated with the mobile communication device 104 (or the femtocell 127 (FIG. 6)) may configure the processor 340 of the mobile communication device 104 (or femtocell) to perform the method 450 and processor-executable instructions associated with the cable interference detection device 119 may configure the processor 240 of the cable interference detection device 119 (FIG. 2) to perform the method 452. More particularly, one or more application or module 360 residing in memory 350 associated with the mobile communication device 104 (such as the interference detection module 364) may configure the associated processor 340 to perform the first method 450 and one or more application or module 260 residing in memory 250 associated with the cable interference detection device 119 may configure the processor of the cable interference detection device 119 to perform the second method 452.

In the example of FIG. 4, the cable interference detection device 119 (FIG. 2) is a back-end wireless network component which is separate from the interference receiving device 125 (i.e. it is separate from the mobile communication device 104 and/or femtocell 127). That is, the cable interference detection device 119 (FIG. 2) does not, itself, directly receive a wireless signal from an interference source 121. The cable interference detection device 119 may, for example, be deployed in a node 106 of the wireless network 101 and/or in the EPC 150 (FIG. 1), or in another part of the wireless network 101 (or outside the wireless network 101, with a link connecting it to the wireless network 101).

At 402 (FIG. 4), a wireless signal is received at the receiver 382 of the interference receiving device 125 (e.g. the mobile communication device 104). The wireless signal is a signal having a frequency that falls within a pass-band of the receiver 382. A wireless signal which does not fall within the pass-band of the receiver 382 may simply be ignored by the mobile communication device 104. Thus, the method 400 may not be performed if a wireless signal does not fall within the pass-band of the receiver; such wireless signals are simply considered to not be "received" by the receiver 382. In at least some embodiments, the mobile communication device 104 is configured to communicate using LTE. Thus, in at least some embodiments, the pass-bands correspond to the pass-bands associated with downlink LTE communications. As noted above in the discussion of FIG. 1, in at least some embodiments, the wireless network 101 with which the mobile communication device 104 (or femtocell 127) communicates is configured to utilize a 700 MHz LTE band.

At 404 a signal signature of the wireless signal is obtained. The signal signature may, for example, be obtained by performing a fast fourier transform on the received wireless signal. More particularly, an FFT block 384 (FIG. 3) associated with the receiver 382 may be used to perform the FFT. Since the signal signature is obtained by performing an FFT on the wireless signal, the signal signature may be considered to be an FFT representation of the wireless signal.

The received wireless signal may either be a wireless network signal associated with the wireless network 101 or it may be a signal of another type. If the wireless signal is not a signal that is associated with a wireless network 101 (i.e. if it is not of a format that is used for communications with the wireless network 101 and its components), then the wireless signal may be considered to be interference. That is, if the wireless signal is not a signal that is associated with a wireless network then it is an unwanted signal, which may be referred to as interference.

Thus, in at least some embodiments, at 406, the mobile communication device 104 (or femtocell 127) determines whether the received signal is an interference signal. In at least some embodiments, it does so by analyzing the signal to determine whether the received signal is associated with a wireless network 101. Since wireless networks 101 typically communicate with mobile communication devices using a known standard, the wireless signals that are generated by such wireless networks should have known properties. These known properties may be referred to as a wireless network signature. In at least some embodiments, the wireless network signature may be stored in memory 350 of the mobile communication device 104 (or femtocell 127) and may be retrieved at 406 by the processor 340. The processor 340 may compare the received wireless signal (and/or the signal signature of the wireless signal obtained at 404) to the wireless network signature to determine whether the signal represents a wireless network signal or whether it represents an unwanted signal (i.e. interference). In other embodiments, the mobile communication device 104 is able to determine the wireless signal is a valid wireless network signal by its ability to decode the information conveyed by that wireless signal. Alternatively, if it cannot decode any information from the wireless signal, it may from that inability determine that the wireless signal is interference and proceed with the method 450. In at least some embodiments, if the mobile communication device 104 is unable to lock onto pilot signals or preamble patterns that are expected to exist for desired wireless signals, then the mobile communication device 104 may determine that the received wireless signal is an interference signal.

If the wireless signal represents a wireless network signal, then no further investigation of a possible interference source is necessary and the method returns to 402 when a further wireless signal is received.

If, however, it is determined that the received wireless signal does not represent a wireless network signal (i.e. if it is determined that the wireless signal is an interference signal), then the interference source 121 may be investigated. More particularly, at 408, location information may be obtained. The location information may, for example, be obtained from a location detection subsystem 324 associated with the mobile communication device 104 (or associated with the femtocell 127). The location information is obtained at the same time or at approximately the same time that the wireless signal is received so that the location information effectively represents the location of the interference. Thus, the location information specifies a location where the interference receiving device 125 (e.g. the mobile communication device 104) was located when the wireless signal was obtained.

As noted in the discussion of the location detection subsystem 324 above, the location information may, in at least some embodiments, be global positioning system (GPS) data. In other embodiments, the location information may be determined using triangulation of wireless network 101 components. More particularly, the location may be obtained based on the location of a node 106 of the wireless network 101 with which the mobile communication device 104 (or femtocell 127) is communicating.

Also in response to determining that the received wireless signal does not represent a wireless network signal (i.e. if it is determined that the wireless signal is an interference signal), at 410 the mobile communication device 104 (or femtocell 127) sends information about the wireless signal to the cable interference detection device 119. For example, in some embodiments, the mobile communication device 104 sends the signal signature of the wireless signal (which was obtained at 404) to the cable interference detection device 119. The signal signature may be sent together with the location information which is associated with the signal signature (i.e. the location information obtained at 408).

The information that is sent from the mobile communication device 104 to the cable interference detection device 119 may, in at least some embodiments, include an amplitude of the received wireless signal. More particularly, in at least some embodiments, wireless interference signal amplitude information may be transmitted, in accordance with the Received Signal Strength Indicator (RSSI) function included in many wireless mobile devices 104.

In other embodiments, the location information may not be obtained at the mobile communication device (or femtocell) at 408 and sent to the cable interference detection device 119 at 410. For example, in at least some embodiments, the location information may be obtained by the cable interference detection device 119 (i.e. it may be obtained at the back-end) in response to receiving the signal signature (which is sent at 410). That is, in response to receiving the signal signature, the cable interference detection device 119 may attempt to locate the mobile communication device 104 (or femtocell 127) e.g. via triangulation with wireless network components such as nodes 106.

At 412, the cable interference detection device 119 obtains the signal signature of the wireless signal that was received at the receiver of the mobile communication device 104 (or femtocell 127) at 402. More particularly, the signal signature which was obtained at the mobile communication device 104 (or femtocell) at 404 is received at the cable interference detection device 119 at 412. Thus, in at least some embodiments the step of obtaining the signal signature (which is performed at 412) includes receiving the signal signature from the mobile communication device (or femtocell). The interference detection device 119 may, in at least some embodiments, receive from the mobile communication device 104 or femtocell the interference signal amplitude with the signal signature. The receipt of the interference signal amplitude at the interference detection device 119 may be received instead of or in addition to the signal signature. That is, the interference detection device 119 may receive the signal signature, the amplitude, or both the signal signature and the amplitude.

In at least some embodiments, the location information associated with the wireless signal represented by the signal signature may also be received at 412. As noted above, the location information may specify a location where the mobile communication device (or femtocell) was located when the wireless signal was obtained.

In response to receiving the signal signature, the cable interference detection device 119 may, at 413, determine whether the wireless signal associated with the signal signature obtained at 412 represents interference caused by the wired network 102 which is, in at least some embodiments, a cable network. This determination (at 413) may be performed using a number of steps. At 414, in at least some embodiments, a cable network signal signature 272 (FIG. 2) may be retrieved. The cable network signal signature may, in at least some embodiments, be retrieved from memory associated with the cable interference detection device 119. The cable network signal signature 272 identifies a format associated with signals in the wired network 102 (which is a cable network in the example). Based on the cable network signal signature, it is possible to determine whether a wireless signal has characteristics that are associated with the wired network 102. The cable network signal signature 272 is, in at least some embodiments, a frequency domain signature. That is, the cable network signal signature 272 represents frequency-based characteristics of signals of the wired network 102.

Then, at 416, the signal signature obtained at 412 (which represents the wireless signal received at the receiver of the mobile communication device 104) is compared to the cable network signal signature 272. In some embodiments, this comparison may be performed by comparing the amplitude at each common frequency represented by the fast fourier transforms (FFTs) for the known and unknown signal signatures respectively (i.e. for the signal signature obtained at 412 and the cable network signal signature 272). A delta value for each FFT frequency might be calculated and the sum of all deltas over the full FFT size might provide an overall measure of match. Other frequency-dependent windowing or weighting formulas may be used to improve the measure of match by reducing the influence of noise energy. Similarly, several FFT samples could be averaged to reduce the impact of noise and fluctuations due to specific information modulation (e.g. QAM) on the interference source. Those skilled in the art may apply other known signal comparison techniques.

Based on the comparison, it is determined (at 418) whether the wireless signal represents interference caused by the wired network 102 (i.e. whether it is cable network interference).

If the signal signature does not appear to be related to the wired network 102 (e.g. if the signal signature of the wireless signal does not have the features required by the cable network signal signature 272), then at 420 data may be logged in memory associated with the cable interference detection device 119. More particularly, the location specified in the location information may be stored so that the source of the interference may be investigated, if necessary.

If, however, the signal signature does suggest that the wireless signal represents interference caused by the wired network 102 (e.g. if the signal signature of the wireless signal has the features required by the cable network signal signature 272), then at 422 corrective action may be taken.

In some embodiments, a notification may be sent to a system associated with the wired network 102 (e.g. to the head end system 103) at 422 to inform the wired network 102 that the wired network 102 contains an interference source 121. For this purpose, the cable interference detection device 119 may be pre-configured to store an address associated with the system of the wired network 102 to which it will send such notifications (e.g. it may store an IP address associated with the wired network system). The notification sent to the wired network system may, for example, include the location information to permit the wired network to easily identify the location of the interference source 121 to correct the issue. It may include interference signal amplitude information for this location as further information to assist with finding the interference source 121.

In some embodiments, a map identifying the location of the interference source 121 (i.e. the location specified in the location information obtained at 412) may be displayed on a display associated with the cable interference detection device 119, the mobile communication device 104 and/or a system associated with the wired network 102. In at least some embodiments, the map may further display a visual representation of topology data 155 associated with the wired network (e.g. cable network topology data 155). As noted previously, the topology data 155 may indicate the location of components associated with the wired network (which may be cable network components in at least some embodiments).

In at least some embodiments, interference data may, at 422, be stored in memory associated with the cable interference detection device 119. The interference data may, for example, identify the location specified in the location information obtained at 412. More particularly, a log of the locations of multiple interference detection reports associated with the wired network may be updated. This log may, for example, be periodically provided to a system of the wired network and/or may be used for other purposes.

In some embodiments, the specific corrective action that is taken at 422 may depend on the number of incidents of interference in proximity to the location specified by the location information obtained at 412. That is, depending on how often a particular interference source 121 has appeared to cause interference in the wireless network, different actions may be taken. Thus, in at least some embodiments, at 422 the cable interference detection device 119 may consult interference data in memory associated with the cable interference detection device to determine whether the number of incidents of interference in proximity to the location specified in the location information obtained at 412 exceeds a predetermined threshold. If the number of incidents is greater than the threshold, then a higher priority corrective action may be taken and if the number of incidents is less than the threshold, then a lower priority correction action may be taken (or no action may be taken). For example, in at least some embodiments, when the number of incidents of interference near the location exceeds the predetermined threshold, an alarm may be triggered while, if the number of incidents is less than the threshold, the alarm may not be triggered. The alarm may, for example, be a visual, audible or vibratory alert or may be a notification or message sent to a particular system or device. For example, in at least some embodiments, the alarm may be sent to a system associated with the wired network, such as the head end system 103.

The method 400 of FIG. 4 may include other steps or features in addition to those illustrated in FIG. 4 and discussed above. For example, in some embodiments, the determination (at 413) of whether the wireless signal represents interference caused by the cable network may consider other information instead of or in addition to the cable network signal signature 272 (FIG. 2). For example, in some embodiments, topology data 155 may be considered. More particularly, in at least some embodiments, the location of the mobile communication device 104 which was obtained from the mobile communication device 104 at 412 may be compared to topology data 155 such as cable network topology data which may indicate the location of cable network components associated with the cable network. More particularly, if the location of the mobile communication device 104 is far from the wired network (e.g. if the distance between the location of the mobile communication device 104 and the location of any component of the wired network exceeds a threshold), then the cable interference detection device 119 may determine that the wired signal is not caused by interference generated by the wired network 102. If, however, the location of the mobile communication device 104 is near the wired network (e.g. if the distance between the location of the mobile communication device 104 and the location of the component of the wired network that is nearest the mobile communication device is less than a threshold), then the cable interference detection device 119 may determine that the wired signal may be caused by interference generated by the wired network 102.

By way of further example in some embodiments, amplitude information which specifies the amplitude of an interference signal at specific location may be used by the cable interference detection system 119 (or by an interference detection system 119 that may not be specifically associated with a cable network). More particularly, since the interference signal represents a signal which was received by the receiver at the mobile communication device 104 but which was not interpreted by the mobile communication device as a wireless network signal, then it may be inferred, in at least some embodiments, that the wireless signal represents interference (i.e. that it is an interference signal). Since the wireless signal represents interference, then amplitude information associated with the interference signal may be used by the cable interference detection system to detect the source of the interference.

In some embodiments, amplitudes associated with a plurality of interference signals received from a plurality of mobile communication devices 104 may be analyzed and/or displayed. For example, in some embodiments, a heat map may be created (and displayed) showing interference levels at various locations. Varied colours, brightness, shading or other visual indicators may be used to indicate concentrations of interference signals. By way of example, a region with a high incidence of interference signals may be represented in using a first colour (e.g. dark red), while a region with no such interference signals may be represented using a second colour (e.g. white).

In at least some embodiments, this heat map may also reflect the topology of the wired network 102. For example, the location of various components associated with the wired network 102 may be displayed on the heat map. The display of the wired network components may, for example, be generated based on the topology data 155.

Furthermore, it will be appreciated that the comparison between the signal signature of the received wireless signal and the cable network signal signature may be performed using a plurality of cable network signal signatures. That is, the signal signature of the received wireless signal may be compared with a number of different cable network signal signatures to determine whether the received wireless signal represents interference caused by a cable network.

Figure 5:
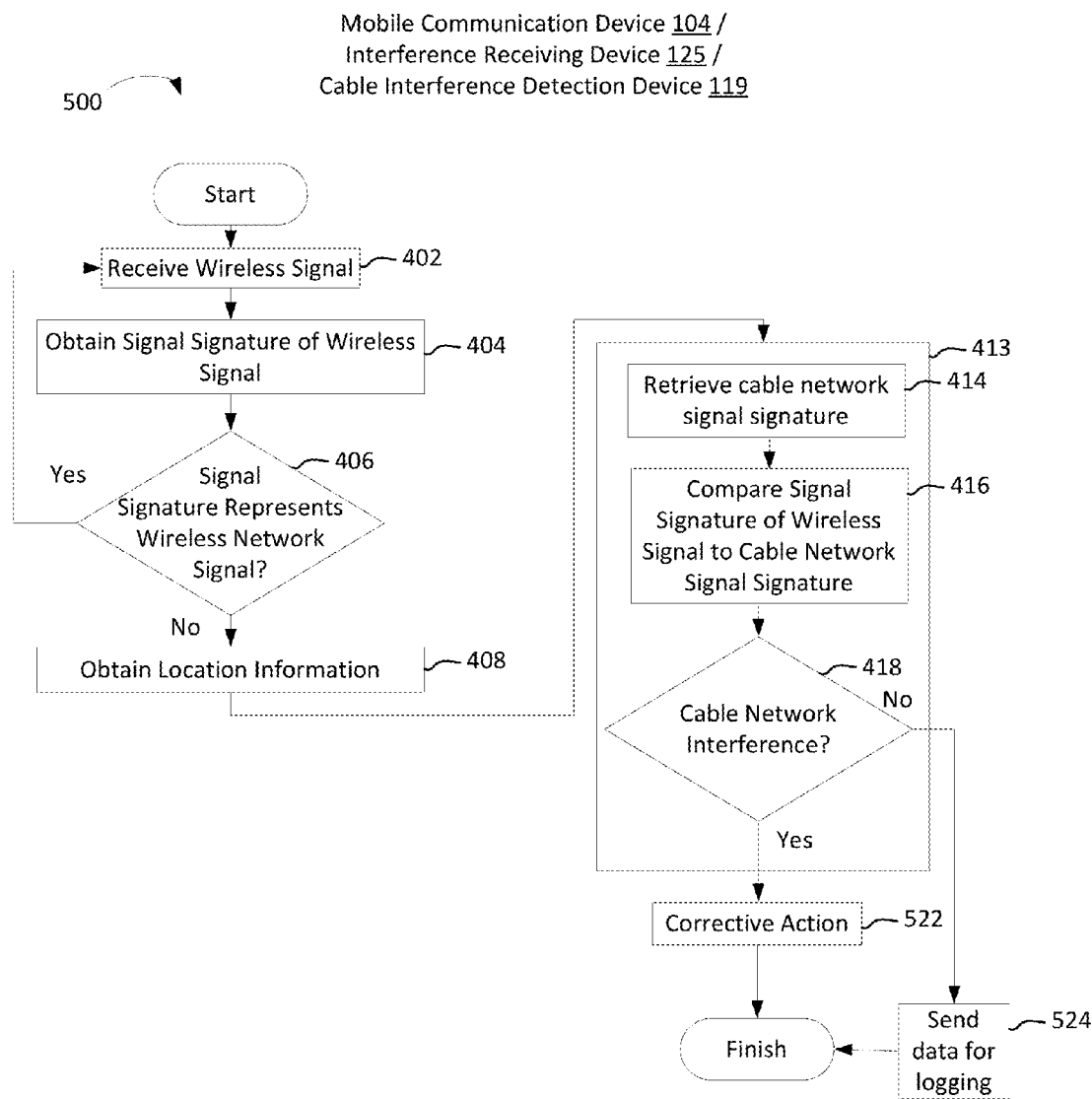
FIG. 5 is a flowchart depicting a further method of detecting interference in a wireless network caused by a cable network in accordance with example embodiments of the present disclosure.

Further Example Method of Identifying an Interference Source Associated with a Wired Network The method 400 of FIG. 4 relied on both an interference receiving device 125 (which was a mobile communication device 104 or femtocell 127 in the example) and a cable interference detection device 119 to identify an interference source associated with a wired network. In other embodiments, a method 500 which identifies such an interference source may be performed wholly on the mobile communication device 104 which acts as both an interference receiving device 125 and a cable interference detection device 119. One such method is illustrated in FIG. 5. This method 500 includes steps and features which correspond to those discussed above with reference to FIG. 4. These related features are identified using common reference numerals and the discussion of the related features will not be repeated at length.

The mobile communication device 104 has access to the cable network signal signature 272 described above with reference to FIGS. 2 and 4. For example, the mobile communication device 104 may store the cable network signal signature 272 in memory of the mobile communication device 104.

At 402, the wireless signal is received as described above and, at 404 a signal signature is obtained as also described above. At 406, the mobile communication device determines whether the signal signature represents a wireless network signal and, if not, location information is obtained (at 408).

Notably, in the method 500, steps 410 and 412 (of the method 400 of FIG. 4) are not included. Instead, the method proceeds directly to determine whether the wireless signal associated with the signal signature obtained at 412 represents interference caused by the wired network 102 (at 413). This may include, at 414, retrieving the cable network signal signature, which may be retrieved from memory of the mobile communication device. Then, at 416, the signal signature of the wireless signal may be compared to the cable network signal signature and at 418 it may be determined whether the wireless signal represents cable network interference.

If the wireless signal represents cable network interference then, at 522, corrective action may be performed (as described above with reference to FIG. 4). The corrective action performed at 522 may be similar to the corrective action described above with reference to step 422 of FIG. 4. However, since the method 500 of FIG. 5 is performed at the mobile communication device 104 while the method 400 of FIG. 4 is performed, in part, at the cable interference detection device 119, steps 422 and 522 may differ. For example, in at least some embodiments, at 522 an alarm or signal may be sent from the mobile communication device 104 to another system which may be associated with the wired network 102 or the wireless network 101. In at least some embodiments, at 522, the location information obtained from the location detection subsystem may be sent to a system connected to the wireless network. That is, the mobile communication device 104 may report back to the wireless network (and/or the wired network) when it identifies interference that is determined to be associated with the wired network. In other embodiments, the mobile communication device 104 may be used by a wired network maintenance technician to determine the wired network defect causing the interference without the need for intermediate processing in either the wired or wireless networks. This may require additional information processing and display functions (application) on the mobile communication device 104 to provide an appropriate indication of leakage information.

More particularly, in at least some embodiments, the mobile communication device 104 includes a display subsystem which is coupled with the processor associated with the mobile communication device 104 and the processor is configured to cause the amplitude of an interference signal to be displayed on the display subsystem. The displayed amplitude may be periodically updated (i.e. to reflect any possible changes) and/or may be displayed response to changes in the amplitude of the interference signal (e.g. if a change in amplitude exceeds a predetermined threshold). This may allow the mobile communication device 104 to be used as a technician test device to help isolate the source of the interference signal.

If the wireless signal does not represent cable network interference then, at 524 data may be sent for logging. More particularly, the location specified in the location information may be sent to a system associated with the wireless network 101 which tracks locations of non-cable interference sources. Such interference sources may be manually investigated e.g. a technician may be sent to investigate the source of the interference.

The method 500 may be performed by one or more processors 340 of the mobile communication device 104 (FIG. 3), in conjunction with other components, such as the communication subsystems 380. For example, processor-executable instructions associated with the mobile communication device 104 may configure the processor 340 of the mobile communication device 104 to perform the method 500. More particularly, one or more application or module 360 residing in memory 350 associated with the mobile communication device 104 (such as the interference detection module 364) may configure the associated processor 340 to perform the method 500.

Using a Femtocell

While the methods and systems described above has generally described systems which utilize a mobile communication device 104 which acts as an interference receiving device 125, in other embodiments, other devices or systems could serve this function. For example, referring now to FIG. 6, an example of a further operating environment 600 is illustrated. The example operating environment includes the features of the example operating environment 100 of FIG. 1, but additionally includes a femtocell 127 which performs the functions of the interference receiving device 125. The femtocell 127 is a small, low-power cellular base station. It may also be referred to as a small cell.

The femtocell 127 may provide improved coverage for mobile communication devices 104. For example, the femtocell may be used to provide coverage indoors or in other locations where wireless coverage is poor. The femtocell 127 may be connected to the Internet. The specific technology used to connect the femtocell 127 to the Internet may vary. In some embodiments, it may be connected using the wired network 102.

The femtocell 127 may include a processor and associated memory. The memory may store computer executable instructions which configure the femtocell to perform the method 450 of FIG. 4. More particularly, the computer executable instructions may configure the femtocell to act as an interference receiving device. The femtocell is typically connected to a power supply which is more robust than the power supply that typically powers the mobile communication device 104. For example, the femtocell may be connected to mains electricity.

Since the femtocell is not connected to a battery, the execution of the method 452 may be performed without sacrificing battery power.

The various techniques described herein may be used in other embodiments not specifically described herein, including in other devices not specifically described herein. For example, in some embodiments, the interference receiving device 125 may be a device that is not a mobile communication device 104 or a femtocell 127. By way of example, the same interference detection and reporting may be used in smart televisions which include communication capabilities, such as internet protocol (IP) connectivity. Such televisions may be equipped with receivers or other technology that enable it to scan for interference. For example, such televisions may monitor for wireless signal signatures (such as 3GPP signatures) at an antenna input and may report the results back to a cable interference detection system 119 of the type described above. The cable interference detection system 119 may, in at least some such embodiments, not operate within the wireless network 101. Instead, the cable interference detection system 119 may operate within the wired network 102, for example.

Further, it will be appreciated that the same techniques may be used on televisions that are not "smart" televisions (i.e. which do not, themselves, have the ability to communicate to the cable interference detection system 119 via IP). For example, such televisions may report back to the cable interference detection system 119 by connecting with another system or device which has better communication capabilities (such as IP communication capabilities). By way of example, a digital living network alliance (DLNA) or High-Definition Multimedia Interface (HDMI) connection to between the non-smart television and the system or device with better communication capabilities may allow the television to report back to the cable interference detection system 119.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method, performed by a processor of a cable interference detection device, of detecting interference in a wireless network caused by a cable network, the method comprising:
   receiving, from a mobile communication device, a signal signature of a wireless signal received at a receiver of the mobile communication device, the signal signature being a fast fourier transform representation of the wireless signal obtained by the mobile communication device by performing a fast fourier transform on the wireless signal; and
   determining that the wireless signal represents interference caused by the cable network by comparing the signal signature to a cable network signal signature,
   wherein the mobile communication device is configured to:
      determine that the wireless signal is an interference signal by determining that the signal signature is not associated with a wireless network signal for the wireless network; and
      send the signal signature to the cable interference detection device in response to determining that the wireless signal is an interference signal.

2. The method of claim 1, further comprising:
   receiving location information associated with the wireless signal, the location information specifying a location where the mobile communication device was located when the wireless signal was obtained.

3. The method of claim 2, wherein the location information is global positioning system (GPS) data and is received from the mobile communication device.

4. The method of claim 2, wherein the location information is determined based on the location of a node of the wireless network with which the mobile communication device is communicating.

5. The method of claim 2, wherein determining that the wireless signal represents interference caused by the cable network further comprises comparing the location to cable network topology data, the cable network topology data indicating the location of cable network components associated with the cable network.

6. The method of claim 2, further comprising,
displaying a map identifying the location on a display associated with the cable interference detection device.

7. The method of claim 6, wherein the map further displays a visual representation of cable network topology data, the cable network topology data indicating the location of cable network components associated with the cable network.

8. The method of claim 2, further comprising, after determining that the wireless signal represents interference caused by the cable network:
storing interference data in a memory associated with the cable interference detection device, the interference data identifying the location.

9. The method of claim 2, further comprising:
consulting interference data in memory associated with the cable interference detection device to determine whether the number of incidents of interference in proximity to the location exceeds a predetermined threshold; and
when the number of incidents of interference near the location exceeds the predetermined threshold, triggering an alarm.

10. The method of claim 1, wherein the cable network signal signature is stored in memory of the cable interference detection device.

11. The method of claim 1, wherein the cable interference detection device is the mobile communication device and wherein obtaining the signal signature of the wireless signal comprises:
obtaining the wireless signal from the receiver of the mobile communication device; and
performing a fast fourier transform on the wireless signal to obtain the signal signature.

12. The method of claim 1, wherein the cable interface detection device is a femtocell.

13. The method of claim 1, wherein the wireless network is a long term evolution network that is configured to utilize a 700 MHz band.

14. A cable interference detection device comprising:
a communication subsystem for receiving, from a mobile communication device, a signal signature of a wireless signal received at a receiver of the mobile communication device, the signal signature being a fast fourier transform representation of the wireless signal obtained by the mobile communication device by performing a fast fourier transform on the wireless signal;
a memory for storing a cable network signal signature; and
a processor coupled with the communication subsystem and the memory, the processor being configured to determine that the wireless signal represents interference caused by the cable network by comparing the signal signature obtained at the communication subsystem with the cable network signal signature,
wherein the mobile communication device is configured to:
determine that the wireless signal is an interference signal by determining that the signal signature is not associated with a wireless network signal for the wireless network; and
send the signal signature to the cable interference detection device in response to determining that the wireless signal is an interference signal.

15. The cable interference detection device of claim 14, wherein the communication subsystem further receives location information associated with the wireless signal, the location information specifying a location where the mobile communication device was located when the wireless signal was obtained.

16. The cable interference detection device of claim 15, further comprising:
displaying a map identifying the location.

\* \* \* \* \*